United States Patent [19]

Kazel

[11] Patent Number: 5,383,588

[45] Date of Patent: Jan. 24, 1995

[54] GARMENT HANGER FOR VEHICLE SEAT

[76] Inventor: Michael D. Kazel, 27636 Avenue Scott, Unit D, Valencia, Calif. 91935

[21] Appl. No.: 119,867

[22] Filed: Sep. 10, 1993

Related U.S. Application Data

[63] Continuation-in-part of Ser. No. 986,486, Dec. 7, 1992, abandoned.

[51] Int. Cl.6 ............................................. B60R 7/10
[52] U.S. Cl. ............................. 224/275; 224/42.46 A; 223/88
[58] Field of Search ............. 224/275, 42.01, 42.46 A, 224/42.46 B, 42.46 R; 211/113, 117; 223/88, 85

[56] References Cited

U.S. PATENT DOCUMENTS

| 2,581,675 | 1/1952 | Lefebvre | 223/85 |
| 3,987,946 | 10/1976 | Haglof | 224/42.46 A |
| 4,261,490 | 4/1981 | Schwartzstein | 223/88 |
| 4,957,230 | 9/1990 | Gonzales | 224/42.46 A |
| 5,058,790 | 10/1991 | LaVelle | 224/275 |

FOREIGN PATENT DOCUMENTS 2239639  7/1991  United Kingdom ............... 224/275

Primary Examiner—Renee S. Luebke
Attorney, Agent, or Firm—Brown, Martin, Haller & McClain

[57] ABSTRACT

A garment hanger apparatus for a vehicle seat has a strap assembly, one end of which is fastened to a vehicle headrest or headrest support, and the other end of which is connected to a garment hanger with a releasable connector. The end of the strap that is connected to the hanger is wrapped over the top of the headrest and allowed to extend downwardly behind the seat back. The releasable connector allows the garment hanger to be separated from the strap while the strap remains fastened to the headrest support. The garment hanger may have a foldable hook that is unfolded to hang the garment when the hanger is separated from the strap.

15 Claims, 2 Drawing Sheets

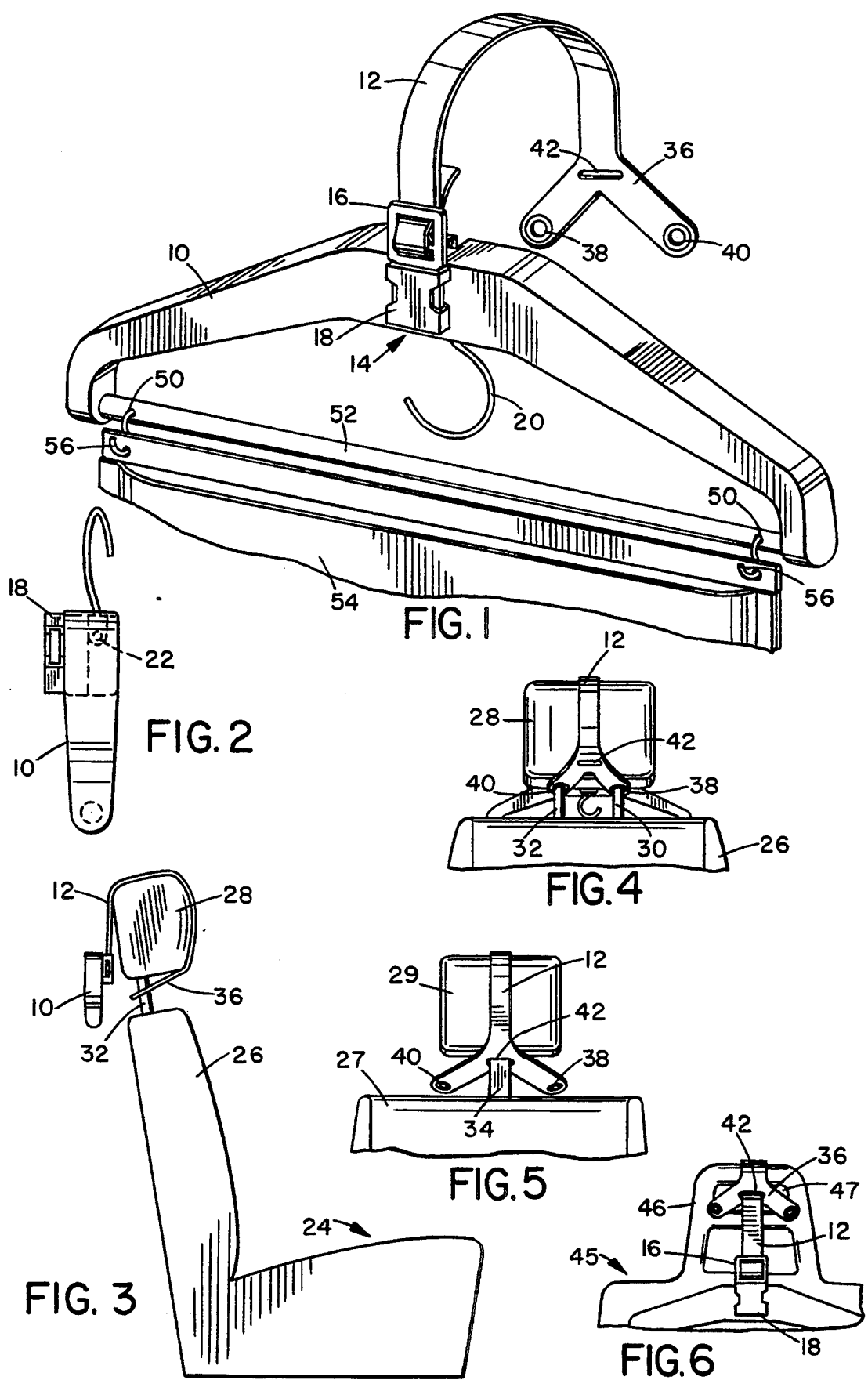

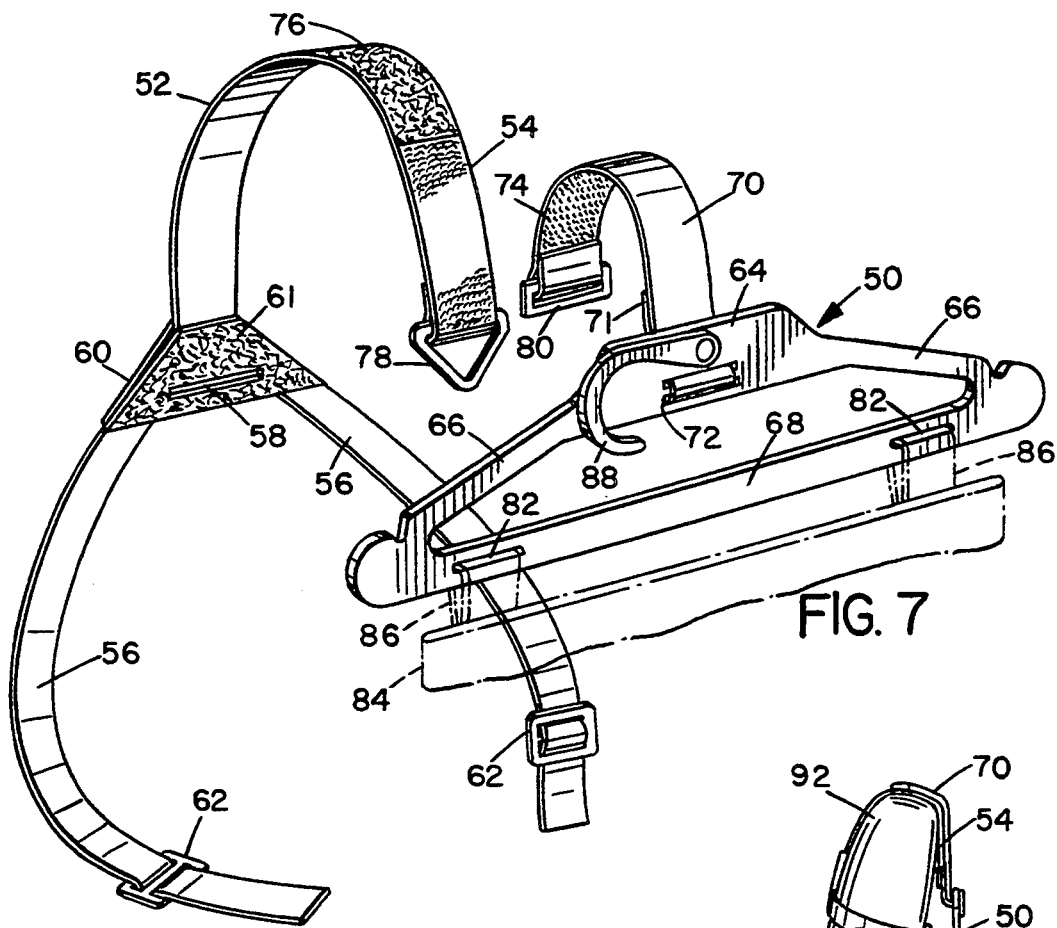

GARMENT HANGER FOR VEHICLE SEAT

CROSS-REFERENCES TO RELATED APPLICATIONS

This application is a continuation-in-part of application Ser. No. 07/986,486 filed Dec. 7, 1992, and now abandoned.

BACKGROUND OF THE INVENTION

The present invention relates generally to garment hangers and is particularly concerned with a garment hanger designed to be supported on a vehicle seat.

Jackets, coats, and other garments are often placed on vehicle seats where they can easily slide off and become creased or soiled. Vehicles are normally equipped with an overhead hook but hanging of garments from such hooks typically obstructs vision through rear side windows of the vehicle, which is both inconvenient and dangerous.

Various devices have been proposed in the past for attaching garment hangers to vehicle seats in order to avoid the foregoing problems. Thus, in U.S. Pat. No. 1,722,122 of Wilson, for example, a wire hanger is described that includes a hook member for gripping the seat back. U.S. Pat. No. 3,007,617 also describes a hanger support that is positioned on top of a vehicle seat back so as to support clothes over the top of the seat. The support system is relatively complex and cumbersome, and takes up an entire seat space in the vehicle. In both U.S. Pat. Nos. 5,058,790 and 4,957,230, hangers are supported at the rear of the vehicle seat back. In both cases, the support depends from the upper portion of the seat back. These problems and deficiencies are clearly felt in the art and are solved by the present invention in the manner described below.

SUMMARY OF THE INVENTION

It is an object of the present invention to provide a new and improved garment hanger apparatus for a vehicle seat.

Although vehicle seat headrests are sometimes formed integrally with the seat back, they are more commonly attached to the seat back via one or two support posts. These support posts extend from the bottom of the headrest and are received by bores in the top of the seat back. The posts move upwardly and downwardly within the bores as the height of the headrest is adjusted.

According to the present invention, a garment hanger apparatus is provided that comprises a strap member, one end of which has a fastener mechanism for securing the strap member to a vehicle headrest or headrest support, and the other end of which is connected to a garment hanger with a releasable connector. To mount the present invention on a vehicle seat, the fastener mechanism is attached to the headrest or headrest support and the strap is wrapped over the top of the headrest and allowed to extend downwardly behind the seat back. The releasable connector connects the garment hanger to the downwardly extending end of the strap.

The garment hanger may be removed from the strap by releasing the connector. Garments may be conveniently placed on the hanger or removed from it while the garment hanger is disconnected from the strap. The garment hanger may have a foldable hook for hanging the garment in locations other than in the vehicle.

The foregoing, together with other features and advantages of the present invention, will become more apparent when referring to the following specification, claims, and accompanying drawings.

BRIEF DESCRIPTION OF THE DRAWINGS

For a more complete understanding of the present invention, the following detailed description of the embodiments illustrated in the accompanying drawings are now referred to, wherein:

FIG. 1 is a perspective view of the hanger apparatus according to a first embodiment of the invention;

FIG. 2 is an end view of the hanger showing the folding hook extended;

FIG. 3 is a side elevation view of a typical vehicle seat with the hanger attached;

FIG. 4 is a front view of the upper portion of the seat with the hanger strap secured to a two-post headrest;

FIG. 5 is a similar front view with the hanger strap secured to a single-post headrest;

FIG. 6 is a rear view of the upper part of a seat with the hanger strap secured around the top bar of a built-in headrest;

FIG. 7 is a perspective view of an alternative configuration of the hanger and retaining strap;

FIG. 8 is a side elevation view of the assembly of FIG. 7 mounted on a vehicle seat with an integral headrest;

FIG. 9 is a front view of the structure of FIG. 8; and

FIG. 10 is a similar front view with the strap assembly secured to a dual post headrest.

DESCRIPTION OF THE PREFERRED EMBODIMENTS

In FIG. 1, a garment hanger 10, a strap 12, and a releasable connector 14 according to a first embodiment of the invention is illustrated. Releasable connector 14 has a tongue portion 16, which is attached to strap 12, and a mating receptacle portion 18, which is attached to garment hanger 10. Garment hanger 10 may have a shape substantially similar to common garment hangers known in the art. Garment hanger 10 preferably has a hook 20 that swings on a hinge-like connection 22 shown in FIG. 2. Strap 12 may be made of any suitable material, such as nylon webbing or flexible plastic. Connector 14 may be any suitable type that can be easily and quickly connected and disconnected, such as a well-known type that has plastic prongs (not shown) on tongue portion 16 that snap into receptacle portion 18. The prongs are squeezed together to release portion 16 from portion 18. Portion 18 may be formed integrally with hanger 10.

The hanger may be mounted on a vehicle seat 24, as shown in FIGS. 2–4. Vehicle seat 24 comprises a seat back 26 and a headrest 28. Headrest 28 is supported above seat back 26 by two posts 30 and 32, as shown in FIG. 4. However, in some vehicles, a headrest 29 may be supported above a seat back 27 by only a single post 34, as shown in FIG. 5. Posts in a vehicle having two posts, such as posts 30 and 32, are typically cylindrical in shape, and the post in a vehicle having only a single post, such as post 34, is typically bar-shaped or oblong to prevent headrest 29 from rotating relative to seat back 27. The present invention can be mounted on vehicle seats having either one or two posts because strap 12 has a Y-shaped end 36 that has two circular openings 38 and 40 on opposite arms of the Y and a third oblong opening 42 at the base of the Y.

Although the arms of the Y have pre-punched holes in the illustrated embodiment, the user may punch holes anywhere along the length of the arm to accommodate different headrest post spacings, or additional holes may be pre-punched at spaced intervals along each arm.

To mount the present invention on seat 24 as in FIG. 4, headrest 28 is removed from seat back 26, thereby withdrawing posts 30 and 32 from bores (not shown) in the top of seat back 26. Posts 30 and 32 are inserted into openings 38 and 40 and then reinserted into the bores. Similarly, the present invention may be mounted on a one-post seat as illustrated in FIG. 5 by inserting post 34 into opening 42 and reinserting post 34 into the bore. Strap 12 is then wrapped over the top of headrest 28 and allowed to extend downwardly, as shown in FIG. 3. In this position, garment hanger 10 may be repeatedly connected and removed from strap 12 using releasable connector 14.

FIG. 6 illustrates a technique for mounting the hanger suspending strap on a vehicle seat 45 having a built-in headrest 46. Such headrests generally have holes 47, and the tongue end 16 of the strap can be looped over the top of the headrest, through hole 47, and then through slot 42 in the strap so as to hang down for engagement with connector 18.

Connector 14 may have an integral loop adjustment for adjusting the length of strap 12, as shown in FIG. 1. However, it is an important advantage of the present invention that the height of garment hanger 10 may be adjusted by simply adjusting the height of headrest 28 or 29.

Garment hanger 10 may include a hook 20 for hanging garment hanger 10 when it is disconnected from strap 12. Hook 20 swings on hinge-like connection 22, and may be extended upwardly to the position shown in FIG. 2 or folded downwardly to the position shown in FIG. 1. Hook 20 may have a shape similar to that of common garment hangers known in the art. Thus, while the present invention is mounted on vehicle seat 24, garment hanger 10 may be disconnected from strap 12 by releasing tongue portion 16 of connector 14 from receptacle portion 18 of connector 14, and hook 20 may then be extended upwardly as shown in FIG. 2. A garment (not shown) may be placed on garment hanger 10, which may then be conveniently hung using hook 20 from any desired object, such as a coat rack (not shown). The garment may be returned to vehicle seat 24 by folding hook 20 downwardly and snapping tongue portion 16 of connector 14 into receptacle portion 18 of connector 14. The hook 20 may also be used for suspending garments from hanger 10 when suspended from a vehicle seat back in the folded down position of FIG. 1.

The garment hanger may also optionally be provided with holes 50 in crossbar 52 for suspending a cloth bag 54 or pocket carrier from the bar via S-hooks 56. Bag 54 may have a zipper fastener (not illustrated) and can be used by persons for carrying loose items such as books, purses, tissues and the like. The hanger can still be used for carrying garments, as can hook 20, providing a multi-use, vehicle storage facility.

FIG. 7 illustrates a modified hanger assembly which can be used with vehicle seats having integral headrests, as in FIGS. 8 and 9, as well as with headrests having supports as in FIGS. 3–6. The hanger assembly basically comprises a garment hanger 50 and a generally Y-shaped strap assembly 52 having an elongate strap or leg 54 and a pair of arms 56 projecting from one end of strap 54 in a Y-shaped configuration. A slit 58 is provided at the junction 60 between the arms 56 and strap 54. Slit 58 has an equivalent purpose to the slit 42 of the previous embodiment. The junction 60 comprises a triangular piece of material with a correspondingly shaped piece 61 of hook-and-loop type fastener material such as Velcro ® secured to one of its faces.

Each arm 56 has a buckle or other adjustable fastener device 62 adjustably mounted adjacent the free end of the belt arm 56. This allows the arms to be secured together or each arm to be wrapped over a support bar or the like with the end secured to the remainder of the arm forming a loop, as will be explained in more detail below.

The garment hanger 50 is of a shape equivalent to that of conventional garment hangers, and has a central portion 64 and a pair of oppositely directed, downwardly inclined arms 66 with a cross bar 68 connecting the free ends of arms 66. A connecting strap 70 is secured to the central portion 64 of the hanger. One end 71 of strap 70 is inserted through slots 72 provided for that purpose in central portion 64 and is then secured to the remainder of the strap through stitching, hook-and-loop fastener material such as Velcro ®, or other equivalent fasteners. A strip 74 of Velcro ® is secured to one face of strap 70. A strip 76 of mating Velcro ® material is secured to an opposing face of the leg 54 of the strap assembly 52. Strap or leg 54 and connecting strap 70 each has a handle or grip member 78,80 at its free end.

The cross bar 68 of the hanger has a slit 82 adjacent each end. This allows a bag 84 to be suspended from the hanger via straps which are secured to the upper end of the bag and extend through the slits, as illustrated in FIG. 7, and are fastened via mating pieces of Velcro ®, buckles, or the like.

As in the first embodiment, hanger 50 has a hook 88 pivotally mounted to central portion 64 which can be rotated down out of the way as in FIG. 1 when the hanger is suspended from a vehicle headrest, and which can be rotated up to suspend the hanger from a hanger rod or hook when the hanger is removed from the vehicle.

This hanger assembly can be suspended from a vehicle seat 90 having an integrally formed headrest 92, as is the case in many vehicles, as well as from the types of vehicle seat illustrated in FIGS. 3–6. In order to suspend hanger 50 from a vehicle seat headrest 92 as illustrated in FIGS. 8 and 9, strap 54 is placed over the top of the headrest so that it extends down on both sides with Velcro ® strip 76 facing outwardly and the junction 60 and arms 56 on the front side of the seat. Velcro ® material 61 at the junction 60 faces inwardly and tends to adhere to the seat. The free ends of the arms 56 are then wrapped around to the rear of the seat and secured together via one of the buckles 62, for example. Connecting strap 70 is then secured to strap 54 via mating Velcro ® strips 74 and 76, as best illustrated in FIG. 8, so that the hanger 50 is suspended at the rear of the seat. The height of the hanger 50 can be adjusted by moving strap 70 up or down relative to the strap 54 before attaching them together, allowing adjustments to be made so that clothing hung on hanger 50 does not touch the floor of the vehicle.

In order to attach the strap assembly to a vehicle headrest 28 having a pair of support posts 30 and 32, each arm 56 is wrapped around a respective one of the posts, as illustrated in FIG. 10. The free end of the arm is then secured to the buckle 62 on that arm to secure the arm to the post. Strap 70 is then pulled up and over the top of the headrest so that the end of strap 70 is suspended at the rear of the headrest. Velcro ® strip 76 faces outwardly for attachment to the mating Velcro ® strip 74 on connecting strap 70, suspending the hanger 50 to the rear of the seat.

The hanger assembly can also be used with a vehicle headrest having a single support post 34, as in FIG. 5 above, in exactly the same manner as in the first embodiment, by inserting the post 34 through the slit 58 at the junction 60, and hanging the strap 54 over the top of the headrest with the Velcro ® material facing outwardly for attachment to the mating Velcro ® strip on connecting strap 70.

This hanger assembly can be used with headrests of the type illustrated in FIG. 6 above, in an identical manner to the hanger strap 12 of the first embodiment. Thus, the strap 54 is simply wrapped over the top bar of the headrest and the free end of strap 54 is inserted through slit 58 to extend downwardly at the rear of the seat. Strap 54 will be oriented so that the Velcro ® strip 76 faces outwardly on the part suspended downwardly through slit 58. The connecting strap 70 can then be attached to the extending portion of strap 54.

The hanger apparatus of this embodiment is very versatile and can essentially be used with any type of vehicle headrest, either integral or separate from the remainder of the seat. It provides a convenient means for supporting clothing and other items in a vehicle without creasing or soiling.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A garment hanger apparatus for a vehicle seat having a headrest, said garment hanger apparatus comprising:
    a strap assembly for extending over a vehicle headrest, said strap assembly having a first end portion for positioning behind a seat back and a second end portion having connector means for connection to a vehicle headrest;
    a garment hanger having a central portion and a pair of oppositely directed side portions; and
    a releasable connector having a first portion attached to said central portion of said garment hanger and a second portion having attachment means for attachment to said first end portion of said strap.

2. The garment hanger apparatus described in claim 1, wherein said second end portion of said strap has an opening for engaging a support post of a vehicle headrest therethrough.

3. The garment hanger apparatus described in claim 1, wherein said second end portion of said strap has first and second openings for engaging two posts of a vehicle headrest therethrough.

4. The garment hanger apparatus described in claim 3, wherein:
    said second end portion of said strap has two arms extending from a base area forming a Y-shaped arrangement; and
    each said opening is disposed on one said arm of said strap.

5. The garment hanger apparatus described in claim 4, wherein said second end portion of said strap has a third opening disposed at said base area for selectively engaging a single headrest support post.

6. The garment hanger apparatus described in claim 5, wherein:
    said first and second openings are circular; and
    said third opening is oblong.

7. The apparatus as claimed in claim 6, wherein the first end portion of the strap is of dimensions smaller than those of the oblong opening so that said first end portion can be inserted through said oblong opening to form a loop, said loop comprising means for securing the strap to a horizontal bar of a headrest.

8. The garment hanger apparatus described in claim 1, further comprising a hook foldably connected to said central portion of said garment hanger.

9. The garment hanger apparatus described in claim 8, wherein said central portion and side portions of said garment hanger lie in a plane and said hook is pivotally secured to said central portion on a pivot axis substantially perpendicular to the plane of said garment hanger.

10. The apparatus as claimed in claim 1, wherein said hanger has a bag member suspended from said hanger for holding loose items.

11. The apparatus as claimed in claim 1, wherein said strap assembly is of generally Y-shaped configuration having a first elongate strap portion comprising said first end portion, said first strap portion having a first, free end and a second end, and a pair of arms projecting from the second end of said first strap portion to form said Y-shape, said arms comprising said second end portion.

12. The apparatus as claimed in claim 11, wherein said arms comprise connector means for wrapping around a vehicle headrest, at least one of said arms having fastener means for securing said one arm to the other arm.

13. The apparatus as claimed in claim 12, wherein said arms further comprise means for selectively wrapping around a pair of headrest support posts, each arm having a free end for wrapping around a post and fastener means for securing said free end to the remainder of the arm.

14. The apparatus as claimed in claim 11, wherein said releasable connector comprises a connector strap having a first end secured to the central portion of said garment hanger, said connector strap and said first strap portion of said strap assembly having releasable fastener means for releasably securing said connector strap to said first strap portion.

15. The apparatus as claimed in claim 14, wherein said connector strap has a first strip of hook-and-loop fastener material secured to one of its faces and said first strap portion of said strap assembly has a second strip of mating hook-and-loop fastener material secured to one of its faces for releasable mating engagement with said first strip.

* * * * *